United States Patent
Ji

(10) Patent No.: US 11,108,874 B2
(45) Date of Patent: *Aug. 31, 2021

(54) COMMUNICATION TOOL FOR INITIATION OF SERVICES

(71) Applicant: Advanced New Technologies Co., Ltd., Grand Cayman (KY)

(72) Inventor: Jing Ji, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/146,159

(22) Filed: Jan. 11, 2021

(65) Prior Publication Data

US 2021/0136159 A1    May 6, 2021

Related U.S. Application Data

(63) Continuation of application No. 15/857,824, filed on Dec. 29, 2017, now Pat. No. 10,893,110, which is a continuation of application No. PCT/CN2016/086873, filed on Jun. 23, 2016.

(30) Foreign Application Priority Data

Jul. 7, 2015    (CN) .......................... 201510395658.1

(51) Int. Cl.
   *H04L 29/08*    (2006.01)
   *G06Q 50/00*    (2012.01)
   *G06Q 10/10*    (2012.01)

(52) U.S. Cl.
   CPC ........... *H04L 67/16* (2013.01); *G06Q 10/107* (2013.01); *G06Q 50/01* (2013.01); *H04L 67/10* (2013.01); *H04L 67/32* (2013.01)

(58) Field of Classification Search
   CPC ...................................... H04L 67/16
   See application file for complete search history.

(56) References Cited

U.S. PATENT DOCUMENTS

| 9,286,401 B2 | 3/2016 | Lee et al. |
| 10,893,110 B2 | 1/2021 | Ji |

(Continued)

FOREIGN PATENT DOCUMENTS

| CN | 101820472 | 9/2010 |
| CN | 102916868 | 2/2013 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Adnan M Mirza
(74) *Attorney, Agent, or Firm* — Fish & Richardson P.C.

(57) ABSTRACT

A service operation is performed using a communication tool. A user selection request is sent. The user selection request includes a rule for selecting a user from a communication group. A user information of the user of the communication group is received based on the rule. A service operation is executed by the user associated to the user information.

18 Claims, 4 Drawing Sheets

(56) References Cited

U.S. PATENT DOCUMENTS

| | | | |
|---|---|---|---|
| 2009/0075633 A1* | 3/2009 | Lee | H04M 1/72469 455/412.2 |
| 2014/0229866 A1 | 8/2014 | Gottlieb | |
| 2014/0250389 A1 | 9/2014 | Zhang et al. | |
| 2015/0127526 A1 | 5/2015 | Ye et al. | |
| 2018/0124190 A1 | 5/2018 | Ji | |

FOREIGN PATENT DOCUMENTS

| | | |
|---|---|---|
| CN | 103095746 | 5/2013 |
| CN | 103108068 | 5/2013 |
| CN | 103188139 | 7/2013 |
| CN | 103513977 | 1/2014 |
| CN | 104660483 | 5/2015 |
| EP | 2648394 | 10/2013 |
| JP | 2012524359 | 10/2012 |
| JP | 2014018421 | 2/2014 |
| JP | 2014178756 | 9/2014 |
| KR | 20140034668 | 3/2014 |

OTHER PUBLICATIONS

Extended European Search Report issued in EP Application No. 16820748.8 dated Mar. 13. 2018; 7 pages.
PCT International Search Report by the International Searching Authority issued in International Application No. PCT/CN2016/086873 dated Sep. 27, 2016; 8 pages.
Nakamoto "Bitcoin: A Peer-to-Peer Electronic Cash System," www.bitcoin.org, 2005, 9 pages.
PCT International Preliminary Report on Patentability in International Application No. PCT/CN2016/086873, dated Jan. 9, 2018, 10 pages (with English translation).
Search Report and Examination Report by the Intellectual Property Office of Singapore issued in Singapore Application No. 11201710784X dated Aug. 29, 2018; 6 pages.

* cited by examiner

COMMUNICATION TOOL FOR INITIATION OF SERVICES

This application is a continuation of U.S. patent application Ser. No. 15/857,824, filed on Dec. 29, 2017, which is a continuation of PCT Application No. PCT/CN2016/086873, filed on Jun. 23, 2016, which claims priority to Chinese Patent Application No. 201510395658.1, filed on Jul. 7, 2015, and each application is incorporated by reference in its entirety.

BACKGROUND

Numerous users around the world are using software communication tools that enable the users to be alerted when others (for example, friends, family, and colleagues) go on-line for a real-time exchange of messages. A commonly used term for a communication tool that enables real-time exchange of text messages, audio messages, and videos is instant messaging (IM). IM software can be used at a low-cost, with most vendors giving away the product/service and others charging nominal licensing fees. IM software generally allows users to exchange messages in one window without interrupting a task in progress in another window (for example, reading a document). Users (for example, team members) in different locations can use IM software to set up conversations and exchange information with each other. However, chat groups in existing IM software have limited functionality, and user satisfaction with the chat groups is low. Particularly, IM software does not usually support transmission of some user data to initiate related services.

SUMMARY

Implementations of the present disclosure include computer-implemented methods for performing a service operation. In some implementations, actions include sending to a server, a user selection request, the user selection request including a rule for selecting a user from a communication group, receiving a user information of the user of the communication group based on the rule, and executing a service operation by the user associated to the user information.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The foregoing and other implementations can each, optionally, include one or more of the following features, alone or in combination. In particular, one implementation can include all the following features:

A first aspect, combinable with any general implementation, includes receiving an interface element presentation instruction sent by the server, the interface element being displayed to enable initiation of the service operation. In a second aspect, combinable with any of the previous or following aspects, the user selection request includes a service identifier of the service operation. In a third aspect, combinable with any of the previous or following aspects, the service identifier defines a service type. In a fourth aspect, combinable with any of the previous or following aspects, the service operation includes a transfer of funds from a first user to a second user. In a fifth aspect, combinable with any of the previous or following aspects, the user information includes at least one of an image identifier and a text identifier of the user corresponding to the user information. In a sixth aspect, combinable with any of the previous or following aspects, the rule includes a parameter defining an interaction range with the communication tool.

The subject matter described in this specification can be implemented in particular implementations, so as to realize one or more of the following advantages. Users are enabled to request a user selection for a service and to perform the service in a software communication tool. The described implementations enrich the functions of the communication tool, facilitate communication between users, beyond the limits of a communication group, and improve service performance and service completion efficiency. That is, the described implementations can efficiently enable the users to have unified knowledge about the determined user information. In comparison to the prior art, in which the users need to edit and issue text information in a communication interface to confirm user information of determined users, the describe solution can, in some implementations, save processing resources of user devices while enabling users to have unified knowledge about the determined users information.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes performing a service operation within a communication tool, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art can be omitted so as to not obscure one or more described implementations. The present disclosure is not intended to be limited to the described or illustrated implementations, but to be accorded the widest scope consistent with the described principles and features.

Numerous users around the world are using software communication tools that enable the users to be alerted when others (for example, friends, family, and colleagues) go on-line for a real-time exchange of messages. A commonly used term for a communication tool that enables real-time exchange of text messages, audio messages, and videos is instant messaging (IM). IM software can be used at a low-cost, with most vendors giving away the product/service and others charging nominal licensing fees. IM software generally allows users to exchange messages in one window without interrupting a task in progress in another window (for example, reading a document). Users (for example, team members) in different locations can use IM software to set up conversations and exchange information with each other. However, chat groups in existing IM software have limited functionality, and user satisfaction with the chat groups is low. Particularly, IM software does not usually support transmission of some user data to initiate related services.

In particular, IM software does not usually support transmission of some user data to initiate related services. An example of a service that can be performed with IM software includes the transfer of Red Envelopes. A Red Envelope service can include transferring a monetary gift (for example, an amount of credit or virtual currency) from one user to one or more other users. The recipients can be identified by the user initiating the Red Envelope service or can be randomly selected by the IM software from a group of users that satisfy service criteria.

Figure 1:
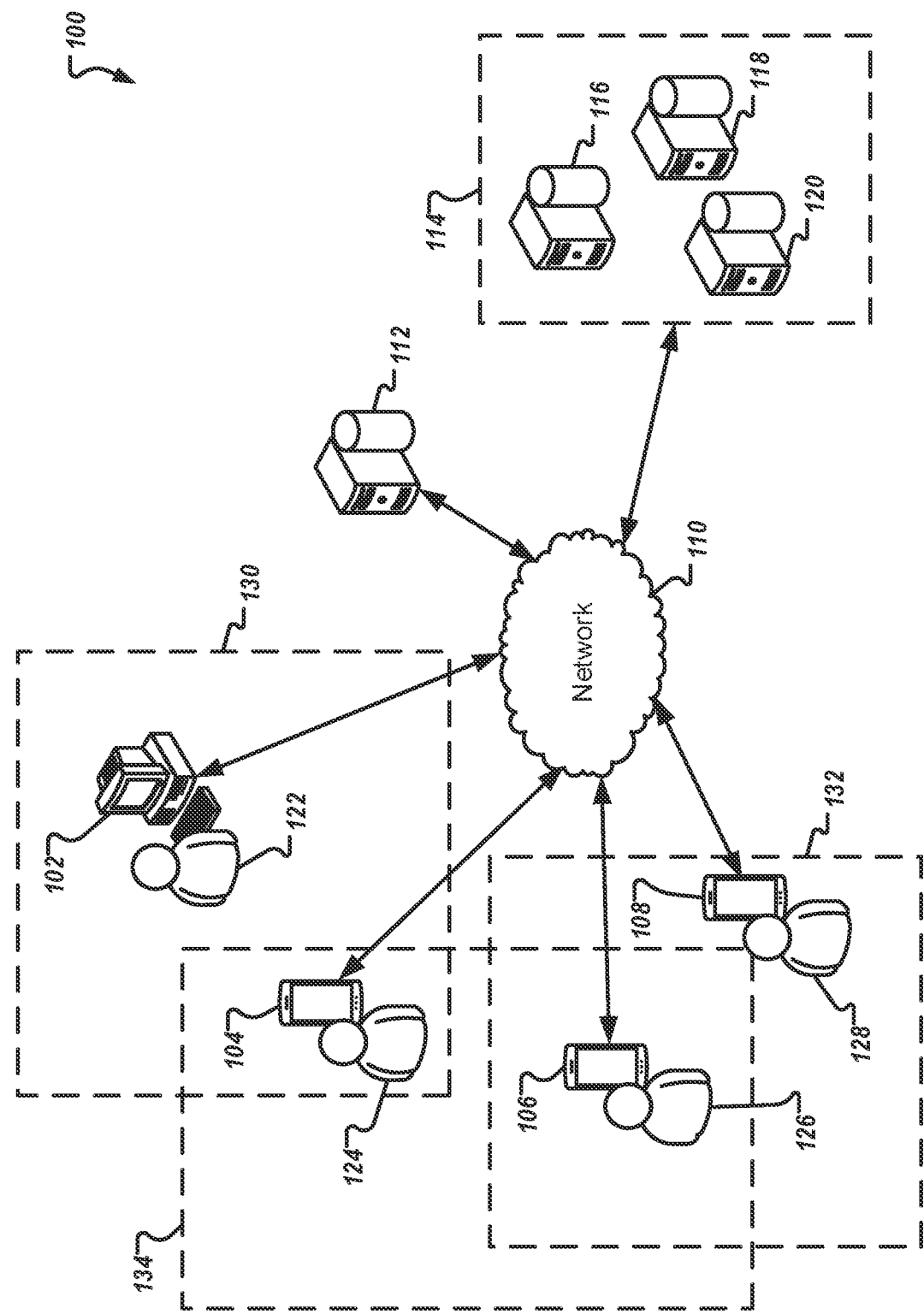
FIG. 1 is a block diagram illustrating an example of a system, according to an implementation of the present disclosure.

FIG. 1 depicts an example of an architecture 100 that can be used to execute implementations of the present disclosure. In the depicted example, the example architecture 100 includes client devices 102, 104, 106, 108, a network 110, a customer server system 112, and a service server system 114. Client devices 102, 104, 106, 108 can communicate with the server systems 112, 114 through the network 110. The service server system 114 includes one or more server devices 116, 118, 120. In the depicted example, users 122, 124, 126, 128 interact with the client devices 102, 104, 106, 108.

The users 122, 124, 126, 128 can interact with the client devices 102, 104, 106, 108 during multiple sessions. During each session, the users 122, 124, 126, 128 can communicate with each other by simultaneously using a communication tool (for example, IM software). The communication tool can enable users to send messages to particular or multiple users within a communication group, by posting content, including text, images, video sequences, audio sequences, or recordings, or other types of audio/visual content.

Communication groups can include multiple users (members), each user capable of performing communication that is visible to all the users of the communication group. The two communication groups can use a communication tool provided by customer server system 112. In an example context, the users 122, 124 can form a first communication group 130 and users 126, 128 can form a second communication group 132 during simultaneous communication sessions.

In some implementations, the service server 112 assigns a unique communication group identifier to each communication group 130, 132, 134. The communication group identifiers can be stored locally in a user device 102, 104, 106, 108, to enable the communication tool to retrieve the communication group identifier from the user devices 102, 104, 106, 108 to the server systems 112, 114.

A user of the first communication group 130 (for example, user 124 of the client device 104) can request a selection of users who qualify as potential candidates for performing a service (for example, virtual credit transfer or payment using Red Envelopes). The service can be requested for users within the same communication group 130 or multiple communication groups 130, 132. In some implementations, if the service is requested for users within multiple communication groups 130, 132, the multiple communication groups 130, 132 qualify if using the same communication tool and are simultaneously open to communication with the communication group 130 from where the request was generated.

The customer server system 112 can receive the initiation requests that are used to identify potential candidates for the service (for example, credit transfer projects). The customer server system 112 can also send participation invitations to the other users identified as potential candidates, and provide participation conditions in the participation invitations.

The customer server system 112 (for example, a communication tool server) can generate participation results based on the responses received from the users (for example, users 124, 126). In some implementations, the participation results are randomly generated or generated according to the user responses of the users associated with the service (for example, credit transfer projects), as described in detail with reference to FIGS. 2 and 3. The customer server system 112 can send the participation results to the service server system 114.

The service server system 114 (for example, a data transfer server or a payment server) is configured to receive participation results indicating the users, the communication groups (for example, the first communication group 130 and the second communication group 132) and the corresponding service. The service server system 114 can select a third communication group 134 as target data points from the pre-established communication groups 130, 132 according to the participation results and preset conditions, the number of users 124, 126 within the third communication group being a positive integer. The service server system 114 is configured to perform the service using the third communication group, as described in detail with reference to FIG. 3. In some implementations, the service server system 114 can generate a result to be displayed based on the participation results, and transmit the result to the respective client devices (for example, client devices 104, 106) for display. The users (for example, users 124, 126) can view the participation results of the associated service (for example, credit transfer projects).

Figure 2:
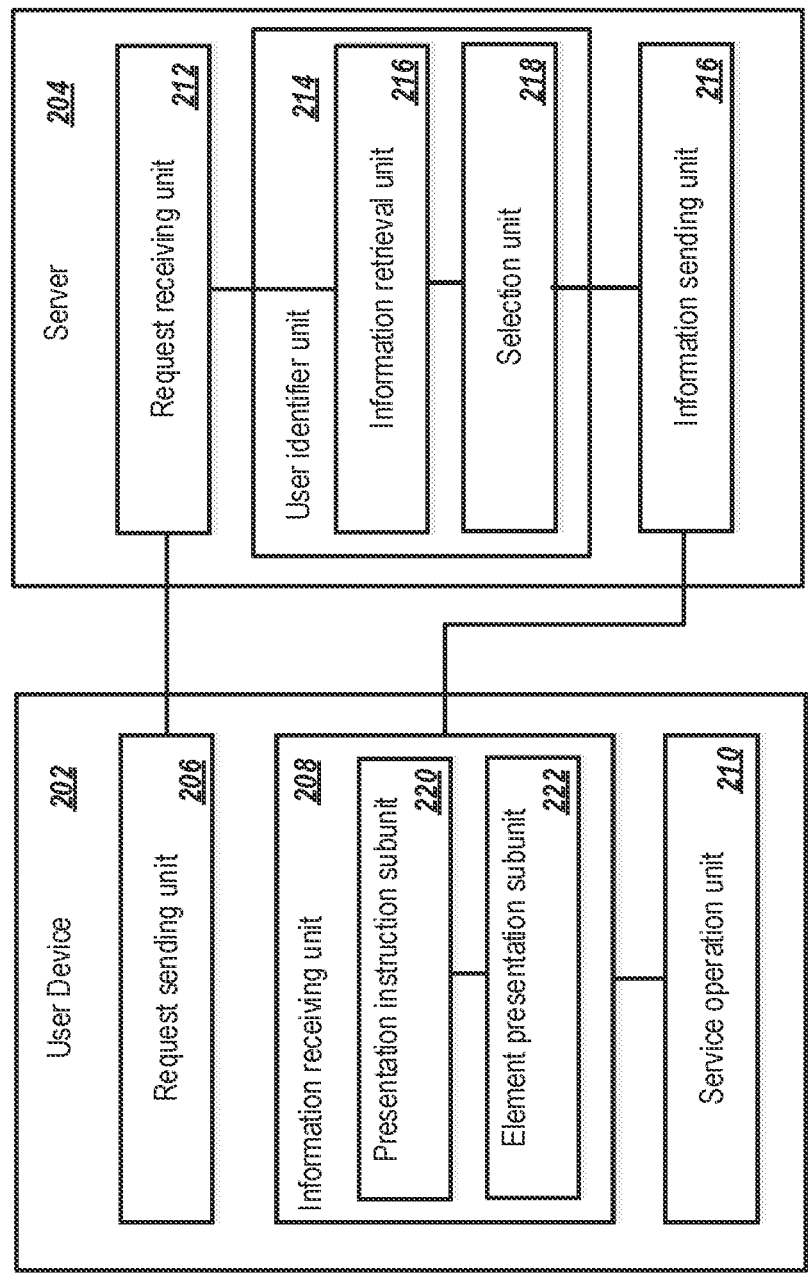
FIG. 2 is a block diagram illustrating an example of an architecture, according to an implementation of the present disclosure.

FIG. 2 illustrates an example of an architecture 200 that can be used to execute implementations of the present disclosure. In the depicted example, the example architecture 200 includes a user device 202 and a server 204. The user device 202 includes a request-sending unit 206, an information-receiving unit 208, and a service operation unit 210. The server 204 includes a request-receiving unit 212, a user identifier unit 214, and an information-sending unit 216.

The request-sending unit 206 is configured to send a user selection request to the request-receiving unit 212. The user selection request can include a user identifier or a user device identifier associated to the user who initiated the request, a communication group identifier, and a rule associated to the request. In some implementations, the user selection request can include a preference of a user on limiting the selection of potential service candidates to the communication group, or extending it to one or more additional communication groups. The request sending unit 206 can include a feature (for example, a button) displayed by the user device within a graphical user interface of the communication group. Any user of the user device 202 can select the displayed feature to initiate a request for a service. In some implementations, in response to receiving the user input, the request-sending unit 206 automatically generates the user selection request and transmits the request to the request-receiving unit 212.

The user identifier unit 214 is configured to receive the user selection request and to process the user selection request to determine at least one user from the chat group according to the rule. The request-receiving unit 212 is configured to transmit the processed request to the user identifier unit 214. The user identifier unit 214 is configured to receive the processed request. In some implementations, the user identifier unit 214 determines the user information randomly, in response to the user selection request. In some implementations, the user identifier unit 214 includes an information retrieval unit 216 and a selection unit 218. The user identifier unit 214 is configured to retrieve user information of a communication group from a database in response to the user selection request received by the request-receiving unit 212. The user identifier unit 214 can use a communication group identifier of the communication group, to which the user belongs as a basis for querying the database. The communication group identifier used as the query basis can be sent by the service provider to the server 204. For example, the service provider can add the identifier to the user selection request or another request, and send the request to the server 204. The selection unit 218 is configured to filter the retrieved user information and transmit it to the information-sending unit 216.

The information-sending unit 216 is configured to send user information of the determined user to the information-receiving unit 208, so that the initiating user or one or more users other than the initiating user execute a predetermined service operation. The transmission of the user information can include display instructions.

The information-receiving unit 208 is configured to receive user information of at least one user that is determined by the server 204 from the communication group according to a predetermined rule in response to the user selection request. The predetermined rule can include a randomized algorithm. In some implementations, the information-receiving unit 208 includes a presentation instruction receiving subunit 220 and an element presentation subunit 222. The presentation instruction-receiving unit 220 can be configured to receive an instruction to present an interface element sent by the server 204. The interface element can correspond to the predetermined service operation. The element presentation subunit 222 can be configured to display the corresponding interface element indicated by the interface element presentation instruction.

The service operation unit 210 is configured to respond to execution of a service performed by a user identified by the user information or to respond to execution of the service performed by a user different from the users identified by the user information. The service operation unit 210 can be configured to respond to execution of the predetermined service operation by the user corresponding to the user information based on an interaction with the displayed interface element. The service operation unit 210 can be configured to respond to execution of the predetermined service operation by user different from the users identified by the user information interacting with the displayed interface element. In some implementations, the service operation unit 210 is configured to display an image and/or a text identifier of the user corresponding to the user information within the GUI of the communication tool. In some implementations, the service operation unit 210 is configured to execute one or more operations associated to the service. In some implementations, the user device 202 does not include a service operation unit 210.

Figure 3A:
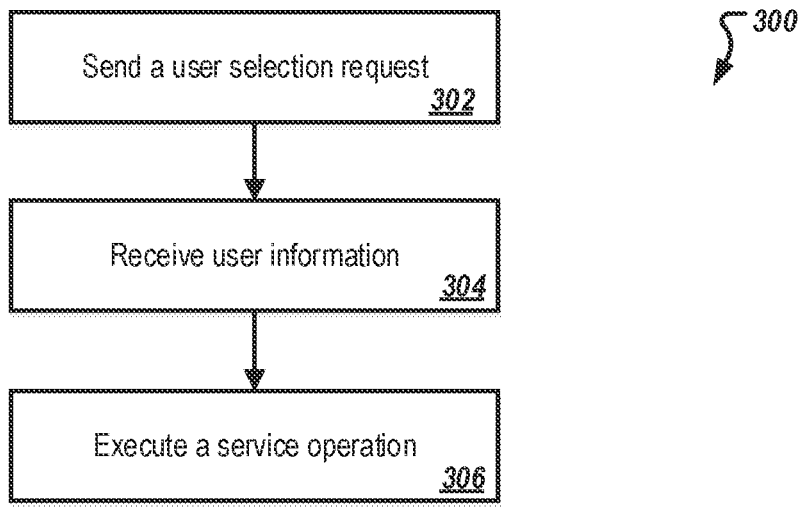
FIGS. 3A and 3B are flowcharts illustrating examples of methods for performing a service operation, according to an implementation of the present disclosure.

FIG. 3A is a flowchart illustrating an example of a method 300 for performing a service operation with a communication tool, according to an implementation of the present disclosure. Method 300 can be implemented as one or more computer-executable programs executed using one or more computing devices, as described with reference to FIGS. 1, 2, and 4. In some implementations, various steps of the example method 300 can be run in parallel, in combination, in loops, or in any order.

At 302, a user selection request corresponding to a communication group is sent to a server. Sending the user selection request can include receiving a user input indicating a selection of a communication tool feature to request a user selection and transmission of the request from a user device to a server. The user selection request includes a service identifier, a rule for determining at least one user from the communication group in response to the user selection request, and a communication group identifier. The rule can include, but is not limited to, at least one of the following: randomly determining at least a portion of user information; sequentially determining at least a portion of user information according to a descending order (or an ascending order) of degrees of activeness of the users in the communication group; sequentially determining at least a portion of user information according to time points when the users join in the communication group from early to late (or from late to early), or a combination thereof.

The service identifier indicates a service type. The service type can be selected by the user from a list of services available for the communication group, the selection automatically triggering the transmission of the associated service identifier. For example, service type can include selection of a host during discussion of a topic, selection of a game to be played by the group, credit transfers, data transfers, or a combination thereof. In some implementations, the service type information includes assignment of particular tasks. For example, some predetermined service operations can be identified as assignable to the user requesting the service or other users different from the user requesting the service. For example, the task can be at least one of the following operations: 1) sending an electronic red envelope to the users in the communication group; 2) paying for an electronic order; 3) answering, by inputting text information, a question that is pushed by the server and can be presented in a picture form or a text form (for example, similar to playing a "Truth or Dare" game).

In some implementations, after the user selection request is transmitted, while the server is processing the request, and until the user information is received, an audio-visual feature (for example, animation) can be displayed to confirm transmission. For example, the user selection request feature (for example, trigger button) can be displayed different from the display manner prior to the request transmission. From 302, method 300 proceeds to 304.

At 304, the user information sent by the server is received by the user device. The user information can include an identifier of the user, such as a real name, a nickname, an ID card number, an account of the user or a unique number of the user in the communication group. The information can be an image information of the user, for example, an avatar picture used by the user in the communication group.

In some implementations, after the user information sent by the server is received, an image of the user corresponding to the received user information can be displayed in the communication interface. For example, when the received user information is an identifier of a user, the communication tool can retrieve an image of the user associated to the user identifier, and display the retrieved image of the user in the communication interface. As another example, if the received user information includes the image information of a user, the image of the user can be directly displayed in the communication interface according to the user information. Generally, the image of the user can refer to an avatar picture used by the user in the communication group.

In some implementations, the image of a user is displayed with a text identifier of the user. The text identifier can include a real name of the user, a nickname of the user, or a unique number of the user in the communication group. In some implementations, after the user information sent by the server is received, a text identifier of the user rather than an image of the user can be displayed in the communication interface. The user terminal can receive the user information determined from information of users in the communication group, without requesting other users in the communication group to edit or to send text information to be displayed in the communication interface. From 304, method 300 proceeds to 306.

At 306, the service operation is executed. For example, the predetermined service operation can be performed by the user corresponding to the user information determined by the server. In some implementations, in order to facilitate the communication tool to execute the service operation, after sending a user determination instruction to the server corresponding to the communication group, the communication tool can receive an interface element presentation instruction sent by the server. The communication tool can present the interface element according to the interface element presentation instruction. The interface element can include an operation entry and a text input field. In some implementations, executing the service operation can include issuing an electronic red envelope to the users in the communication group, paying for an electronic order, or transferring data between users.

In some implementations, executing the service operation can include generating a query for a user input, receiving a selection instruction for the operation entry from the user corresponding to the server-determined user information, executing an operation corresponding to the operation entry in response to the selection instruction and displaying information associated with the service operation. After the communication tool presents the operation entries, the user using the communication tool can select from the presented operation entries. In response to receiving a selection instruction for an operation entry, the communication tool can perform an additional service operation associated to the selection instruction.

For example, the communication tool can receive a selection instruction for a payment operation entry for an electronic order. In response to the instruction, the communication tool can send a payment request including an electronic order to a payment server, so as to trigger the payment server to perform a deduction operation on a payment institution electronic account of the user according to the electronic order. It should be noted that the electronic order can be an electronic order, which a user in the communication group requests a merchant server to generate and is shared in the communication group. By sharing the electronic order in the communication group, user terminals respectively used by all the users in the communication group can retrieve the electronic order. In some implementations, when the payment request is sent, the user can select, according to a prompt of the communication tool, an electronic order from shared electronic orders in the communication group and use the selected electronic order as the electronic order included in the payment request. In some implementations, the communication tool can automatically select an electronic order from shared electronic orders in the communication group and use the selected electronic order as the electronic order included in the payment request. In response, the communication tool can select a recently shared electronic order that has not been paid for yet.

As another example, the communication tool receives a selection instruction for a generation operation entry for an electronic red envelope. In response to the instruction, the communication tool can send an electronic red envelope generation request to a server (such as an electronic red envelope server), so as to trigger the server to generate an electronic red envelope according to the electronic red envelope generation request and send the electronic red envelope to the communication tool. After receiving the electronic red envelope, the communication tool sends it to the communication interface of the communication group for sharing, so that a user in the communication group can retrieve all or a portion of the (virtual) currency in the electronic red envelope.

In another example of an electronic red envelope operation, the operation executed by the communication tool can be: sending an electronic red envelope generation request to a serve (such as an electronic red envelope server), so as to trigger the server to generate at least one electronic red envelope according to the electronic red envelope generation request and directly send the generated electronic red envelope to a user terminal used by another user in the communication group. After 306, method 300 stops.

Figure 3B:
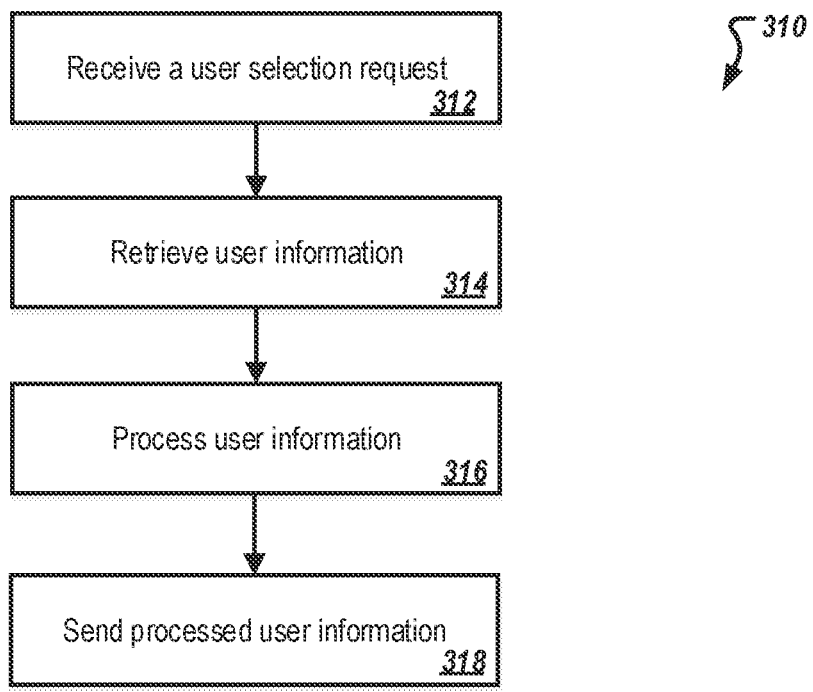

FIG. 3B is a flowchart illustrating an example of a method 310 for performing a service operation with a communication tool, according to an implementation of the present disclosure. Method 310 can be implemented as one or more computer-executable programs executed using one or more computing devices, as described with reference to FIGS. 1, 2, and 4. In some implementations, various steps of the example method 310 can be run in parallel, in combination, in loops, or in any order.

At 312, a user selection request is received. The user selection request includes a rule and a communication group identifier. The rule can be defined or selected by a user of the user device. The communication group identifier can be associated to one or more groups associated to the user generating the request. In some implementations, the communication group identifier can be associated to a group indicated by the user, which can be different from the groups associated to the user generating the request. From 312, method 310 proceeds to 314.

At 314, user information is retrieved based on the request. In response to the user selection request, the server can determine a user from a database for storing user information of the communication group. The database can be the queried by using the communication group identifier to retrieve user information associated to the users of the communication group. From 314, method 310 proceeds to 316.

At 316, the retrieved user information is processed. The retrieved user information can be processed using the rule included in the user selection request. For example, the rule can be used to filter the user information and select qualifying users from the users of the communication group. The qualifying users can include all users in the communication group or a portion of the users in the communication group. The qualifying users can be users having a particular characteristic that matches a requirement defined by the rule. The particular characteristic can include one or more of parameters (frequency, time, duration) indicating an interaction with the communication tool, gender, age range, interests, expertise, financial conditions, or geographical location. From 316, method 310 proceeds to 318.

At 318, the processed user information is sent to a user device of a recipient. The recipients can include one or more of the initiating user, and the qualifying users of the communication group. After 318, method 310 stops.

Figure 4:
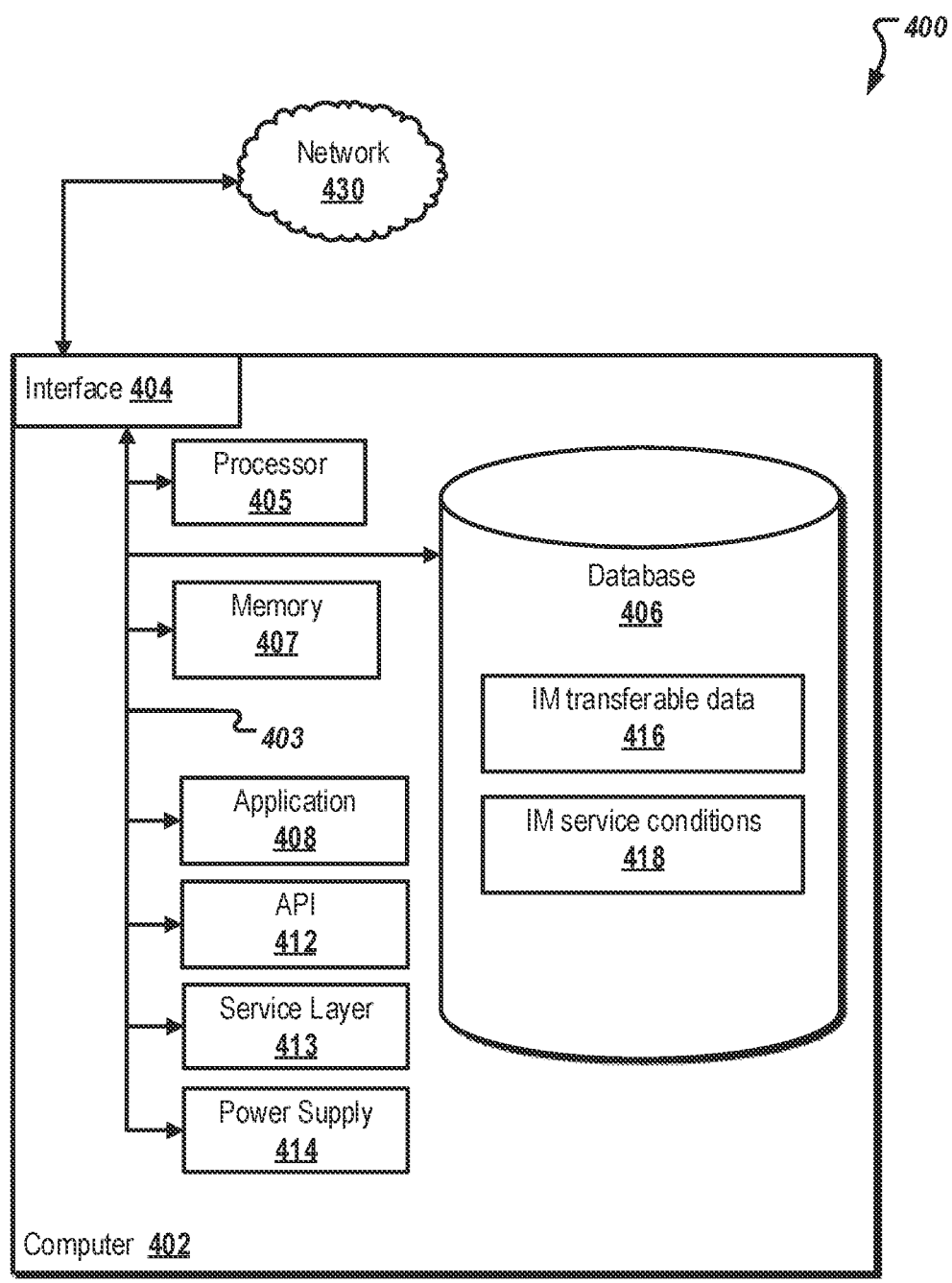
FIG. 4 is a block diagram illustrating an example of a computer system used to provide computational functionalities associated with described algorithms, methods, functions, processes, flows, and procedures, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, System 400 includes a Computer 402 and a Network 430.

The illustrated Computer 402 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 402 can include an input device, such as a keypad, keyboard, touch screen, another input device, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as a client, network component, a server, a database or another persistency, another role, or a combination of roles for performing the subject matter described in the present disclosure. The illustrated Computer 402 is communicably coupled with a Network 430. In some implementations, one or more components of the Computer 402 can be configured to operate within an environment, including cloud-computing-based, local, global, another environment, or a combination of environments.

At a high level, the Computer 402 is an electronic computing device operable to receive, transmit, process, store, or manage data and information associated with the described subject matter. According to some implementations, the Computer 402 can also include or be communicably coupled with a server, including an application server, e-mail server, web server, caching server, streaming data server, another server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third-parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory, conventional, or another type of database storing data consistent with the present disclosure. In some implementations, Database 406 can be a combination of two or more different database types (for example, a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402. As illustrated, the database 406 holds previously described IM transferable data 416 (for example, virtual currency, bonus points) and IM service conditions 418.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Described implementations of the subject matter can include one or more features, alone or in combination.

For example, in a first implementation, computer-implemented method for performing a service operation within a communication tool, the method being executed by one or more processors and includes: sending to a server, a user selection request, the user selection request including a rule for selecting a user from a communication group, receiving a user information of the user of the communication group based on the rule, and executing a service operation by the user associated to the user information.

The foregoing and other described implementations can each, optionally, include one or more of the following features:

A first feature, combinable with any general implementation, includes receiving an interface element presentation instruction sent by the server, the interface element being displayed to enable initiation of the service operation.

In a second feature, combinable with any of the previous or following features, the user selection request includes a service identifier of the service operation.

In a third feature, combinable with any of the previous or following features, the service identifier defines a service type.

In a fourth feature, combinable with any of the previous or following features, the service operation includes a transfer of funds from a first user to a second user.

In a fifth feature, combinable with any of the previous or following features, the user information includes at least one of an image identifier and a text identifier of the user corresponding to the user information.

In a sixth feature, combinable with any of the previous or following features, the rule includes a parameter defining an interaction range with the communication tool.

In a second implementation, a non-transitory, computer-readable medium storing one or more instructions executable by a computer system to perform operations for performing a service operation within a communication tool, the operations include: sending, to a server, a user selection request, the user selection request including a rule for selecting a user from a communication group, receiving a user information of the user of the communication group based on the rule, and executing a service operation by the user associated to the user information.

The foregoing and other described implementations can each, optionally, include one or more of the following features:

A first feature, combinable with any general implementation, includes receiving an interface element presentation instruction sent by the server, the interface element being displayed to enable initiation of the service operation.

In a second feature, combinable with any of the previous or following features, the user selection request includes a service identifier of the service operation.

In a third feature, combinable with any of the previous or following features, the service identifier defines a service type.

In a fourth feature, combinable with any of the previous or following features, the service operation includes a transfer of funds from a first user to a second user.

In a fifth feature, combinable with any of the previous or following features, the user information includes at least one of an image identifier and a text identifier of the user corresponding to the user information.

In a sixth feature, combinable with any of the previous or following features, the rule includes a parameter defining an interaction range with the communication tool.

In a third implementation, a computer-implemented system for performing a service operation within a communication tool, includes: one or more computers, and one or more computer memory devices interoperably coupled with the one or more computers and having tangible, non-transitory, machine-readable media storing instructions that, when executed by the one or more computers, perform operations including: sending, to a server, a user selection request, the user selection request including a rule for selecting a user from a communication group, receiving a user information of the user of the communication group based on the rule, and executing a service operation by the user associated to the user information.

The foregoing and other described implementations can each, optionally, include one or more of the following features:

A first feature, combinable with any general implementation, includes receiving an interface element presentation instruction sent by the server, the interface element being displayed to enable initiation of the service operation.

In a second feature, combinable with any of the previous or following features, the user selection request includes a service identifier of the service operation.

In a third feature, combinable with any of the previous or following features, the service identifier defines a service type.

In a fourth feature, combinable with any of the previous or following features, the service operation includes a transfer of funds from a first user to a second user.

In a fifth feature, combinable with any of the previous or following features, the user information includes at least one of an image identifier and a text identifier of the user corresponding to the user information.

In a sixth feature, combinable with any of the previous or following features, the rule includes a parameter defining an interaction range with the communication tool.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 seconds. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client-computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    sending, by one or more processors of a client computing device to a server, a group member selection request, the group member selection request comprising a service identifier of a service operation, a rule for selecting by the server a group member from a communication group, and a communication group identifier, wherein the rule for selecting the group member from the communication group comprises at least one of:
        randomly determining at least one piece of group member information of the group member from the communication group, or
        sequentially determining the at least one piece of group member information of the group member according to a descending order of degrees of activeness of group members in the communication group;
    receiving, by the one or more processors of the client computing device, the group member information of the group member selected from the communication group by the server based on the rule; and
    responding, by the one or more processors of the client computing device, to execution of the service operation by the group member associated with the group member information of the group member, or by another group member other than the group member corresponding to the group member information of the group member.

2. The computer-implemented method of claim 1, further comprising receiving an interface element presentation instruction sent by the server to display an interface element on the client computing device, the interface element being displayed to enable initiation of the service operation.

3. The computer-implemented method of claim 1, wherein the service identifier defines a service type.

4. The computer-implemented method of claim 1, wherein the group member information of the group member comprises at least one of an image identifier and a text identifier of the group member corresponding to the group member information of the group member.

5. The computer-implemented method of claim 1, wherein the rule further comprises a parameter defining an interaction range with a communication tool.

6. The computer-implemented method of claim 1, wherein the service operation comprises one or more of transferring funds from a first group member in the communication group to a second group member in the communication group, issuing an electronic red envelope to the group members in the communication group, paying for an electronic order, transferring data between the group members in the communication group, answering a question from the server, selecting a host during discussion of a topic, or selecting a game to be played by the group members in the communication group.

7. A non-transitory, computer-readable medium storing one or more instructions executable by a computer system to perform operations, wherein the operations comprise:
    sending, to a server, a group member selection request, the group member selection request comprising a service identifier of a service operation, a rule for selecting by the server a group member from a communication group, and a communication group identifier, wherein the rule for selecting the group member from the communication group comprises at least one of:
        randomly determining at least one piece of group member information of the group member from the communication group, or
        sequentially determining the at least one piece of group member information of the group member according to a descending order of degrees of activeness of group members in the communication group;
    receiving the group member information of the group member selected from the communication group by the server based on the rule; and
    responding to execution of the service operation by the group member associated with the group member information of the group member, or by another group member other than the group member corresponding to the group member information of the group member.

8. The non-transitory, computer-readable medium of claim 7, wherein the operations further comprise receiving an interface element presentation instruction sent by the server to display an interface element, the interface element being displayed to enable initiation of the service operation.

9. The non-transitory, computer-readable medium of claim 7, wherein the service identifier defines a service type.

10. The non-transitory, computer-readable medium of claim 7, wherein the group member information of the group member comprises at least one of an image identifier and a text identifier of the group member corresponding to the group member information of the group member.

11. The non-transitory, computer-readable medium of claim 7, wherein the rule further comprises a parameter defining an interaction range with a communication tool.

12. The non-transitory, computer-readable medium of claim 7, wherein the service operation comprises one or more of transferring funds from a first group member in the communication group to a second group member in the communication group, issuing an electronic red envelope to the group members in the communication group, paying for an electronic order, transferring data between the group members in the communication group, answering a question from the server, selecting a host during discussion of a topic, or selecting a game to be played by the group members in the communication group.

13. A computer-implemented system, comprising:
one or more computers; and
one or more computer memory devices interoperably coupled with the one or more computers and having tangible, non-transitory, machine-readable media storing instructions that, when executed by the one or more computers, perform operations comprising:
sending, to a server, a group member selection request, the group member selection request comprising a service identifier of a service operation, a rule for selecting by the server a group member from a communication group, and a communication group identifier, wherein the rule for selecting the group member from the communication group comprises at least one of:
randomly determining at least one piece of group member information of the group member from the communication group, or
sequentially determining the at least one piece of group member information of the group member according to a descending order of degrees of activeness of group members in the communication group;
receiving the group member information of the group member selected from the communication group by the server based on the rule; and
responding to execution of the service operation by the group member associated with the group member information, or by another group member other than the group member corresponding to the group member information.

14. The computer-implemented system of claim 13, wherein the operations further comprise receiving an interface element presentation instruction sent by the server to display an interface element, the interface element being displayed to enable initiation of the service operation.

15. The computer-implemented system of claim 13, wherein the service identifier defines a service type.

16. The computer-implemented system of claim 13, wherein the group member information of the group member comprises at least one of an image identifier and a text identifier of the group member corresponding to the group member information of the group member.

17. The computer-implemented system of claim 13, wherein the rule further comprises a parameter defining an interaction range with a communication tool.

18. The computer-implemented system of claim 13, wherein the service operation comprises one or more of transferring funds from a first group member in the communication group to a second group member in the communication group, issuing an electronic red envelope to the group members in the communication group, paying for an electronic order, transferring data between the group members in the communication group, answering a question from the server, selecting a host during discussion of a topic, or selecting a game to be played by the group members in the communication group.

* * * * *